3,783,122
INTERCELL BUS BAR CONNECTION MEANS
Chosei Sato, Takeshi Adachi, and Hiroyuki Inoy, Kanagawa, Japan, assignors to Showa Denko Kabushiki Kaisha, Tokyo, Japan
Filed Mar. 8, 1972, Ser. No. 232,768
Claims priority, application Japan, Mar. 9, 1971, 46/12,200
Int. Cl. B01k 3/00
U.S. Cl. 204—279                    3 Claims

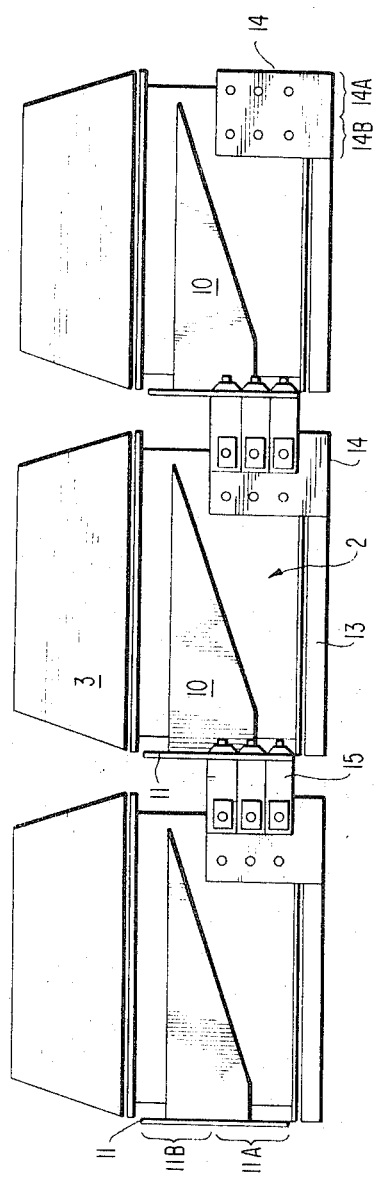
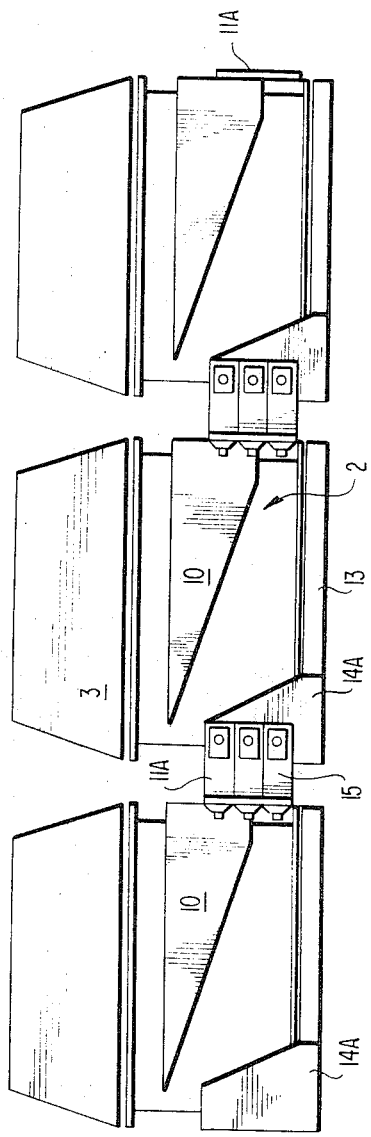
FIG. 4
FIG. 5

# United States Patent Office 3,783,122
Patented Jan. 1, 1974

ABSTRACT OF THE DISCLOSURE

A bus bar assembly for a diaphragm-type electrolytic cell for electrically connecting a side portion of a cathode structure to an end portion of an anode base comprising cathode bus bars connected to a side portion of said cathode structure, said cathode bus bars having an end portion thereof at an outward angle transverse to the plane of said cathode bus bar and anode bus bars connected to an end portion of said anode base, said anode bus bars having a portion thereof at an upward angle transverse to the plane of said anode bus bar is disclosed.

BACKGROUND OF THE INVENTION

(1) Field of the invention

This invention relates to a bus bar structure of a diaphragm-type electrolytic cell, and a method of connecting bus bars. More particularly, this invention relates to a bus bar structure which can be applied especially effectively to vertical diaphragm-type electrolytic cells for common salt (sodium chloride), but also to other electrolytic cells.

(2) Descrpition of the prior art

Usually, an electrolytic cell is electrically connected to another electrolytic cell by connecting the cathode bus bar to the anode bus bar using intercell bus bar. The bus bars are made of good electrical conductors such as copper or aluminum.

It is important in practice that the bus bar structure should be designed so as to provide optimum conditions for connection of each bus bar. In order to provide optimum conditions, the following requirements should be met.

(1) Electrical connection should be performed sufficiently, and there is little electrical loss.
(2) Bus bars should be attached to the electrolytic cell simply and safely.
(3) The bus bars to be used should be small in weight.
(4) Consideration should be given to minimizing the floor space occupied by each electrolytic cell.
(5) The bus bars should be easy to disconnect at the time of stoppage and disassembling of the electrolytic cells.
(6) The bus bar structure should permit easy attachment of short circuit switches.

However, prior art bus bar structures and methods of connecting bus bars have failed to meet completely these requirements, and problems still need to be solved.

Accordingly, a primary object of this invention is to provide a novel bus bar structure for an electrolytic cell of the diaphragm type, which fully meets the above-mentioned requirements.

It is a further object of this inention to provide a method of connecting bus bars of an electrolytic cell of the diaphragm type.

SUMMARY OF THE INVENTION

These objects can be achieved by a bus bar structure of a diaphragm-type electrolytic cell, including cathode bus bars having an outwardly bent portion for connection at one end thereof and secured to a side wall of a cathode structure, and anode bus bars having an upwardly bent portion for connection at an end thereof and provided at a side end portion of an anode base.

BRIEF DESCRIPTION OF THE ACCOMPANYING DRAWINGS

The invention will now be described in greater detail by reference to the accompanying drawings.

FIG. 4 is a front elevation along the line A—A of FIG. 3.

FIG. 5 is a front elevation along the line B—B of FIG. 3.

DESCRIPTION OF PREFERRED EMBODIMENTS

Figure 1:
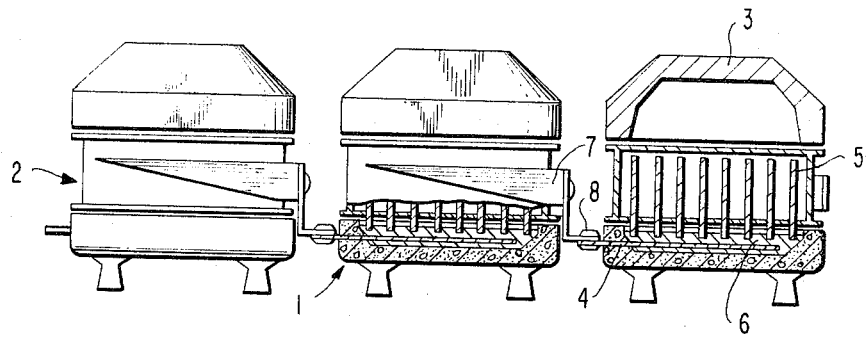
FIGS. 1 and 2 are explanatory views showing, in a partly cutaway section, a typical example of the conventional bus bar structure of an electrolytic cell.
Figure 2:
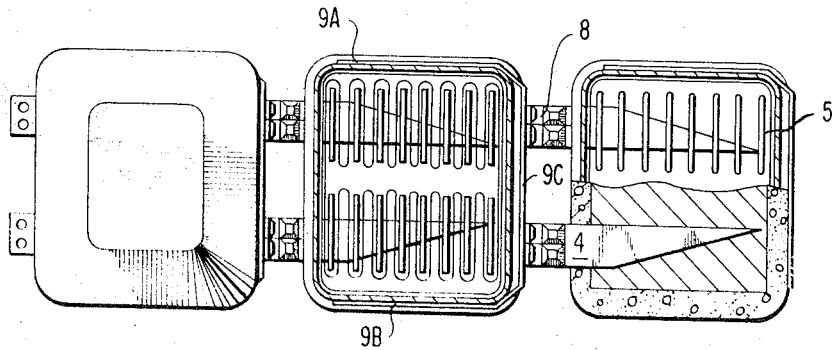

The structure shown in FIGS. 1 and 2 is disclosed in U.S. Pat. 3,432,422, and has been previously regarded as superior in design. The electrolytic cell shown consists of an anode base 1, a cathode structure 2, and a cover 3 as principal elements. An anode bus bar 4 is provided at the bottom of the anode base, and the bus bar 4 is electrically and mechanically connected to an anode electrode 5 using a lead material. The cathode structure 2 has fixed thereto a cathode bus bar 7. In an electrolytic cell of this structure, the cathode bus bar 7 and the anode bus bar 4 are connected electrically by an intercell bus bar 8.

This conventional bus bar structure, however, suffers from the following defects.

(a) Since the bus connection is made between one cell and an adjacent cell, the intercell bus bar 8 should be mounted or dismounted as the electrolytic cell is in operation or is desired to be put out of operation. Hence, the intercell distance should be such that the working personnel can do the necessary work for mounting or dismounting. As a result, since in the prior art assembly and disassembly of the bus bar connection is made between the cells the output per unit area of floor space is reduced, and the weight of the bus bars used increases, which in turn results in increased expenditures for construction and depreciation.

(b) In order to prevent a deviation in the current distribution at the time of installing a short circuit switch to the cathode bus bar 7, bus bar 9A on the A side of the cathode structure is connected to bus bar 9B on the B side using bus bar 9C on the C side. A greater part of the bus bar 9C on the C side is not necessary for operation, but is necessitated only when the adjoining electrolytic cell is out of operation. This eventually leads to an increase in construction expenditure as a result of an increased weight of the bus bars. Furthermore, the conventional bus bar structure involves a very poor working efficiency between the electrolytic cells. The weight of the bus bar increases with an increased current capacitance. An attempt to connect such bus bars of a large weight so as to minimize the contact resistance results in a greater extent of reduction in working efficiency in the narrow space between the electrolytic cells.

The present invention makes it possible to remove the disadvantages of the typical conventional electrolytic cells described above, and provides an excellent bus bar structure which fully meets all of the requirements described above.

Figure 3:
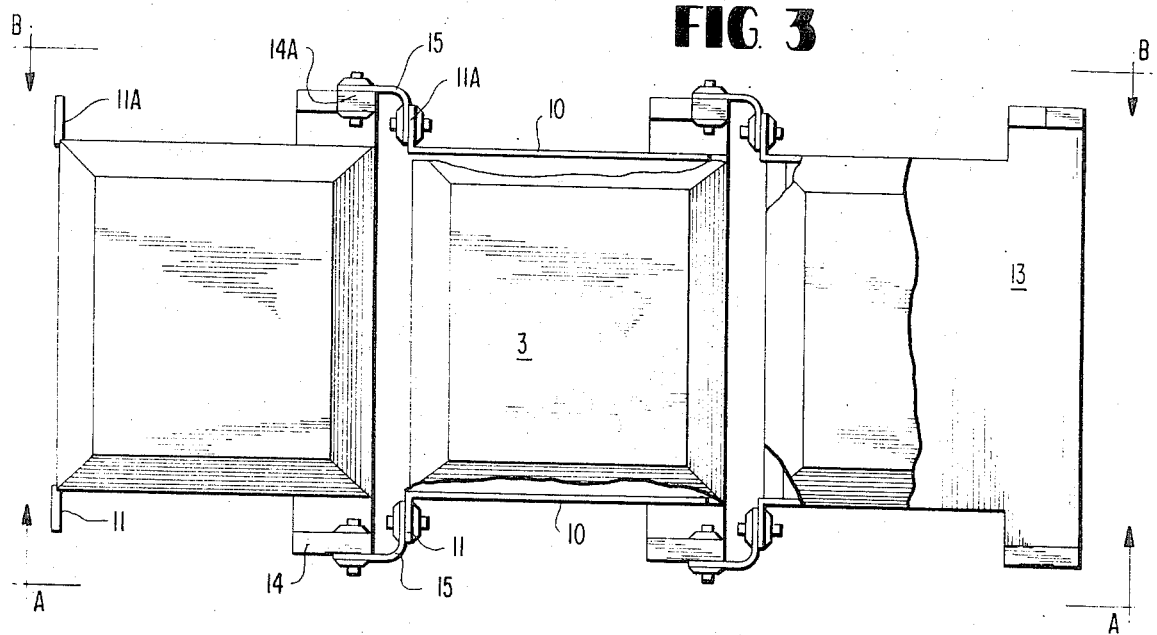
FIG. 3 is a plan view showing the principal part of the bus bar structure of this invention.

A specific embodiment of this invention will be described with reference to the accompanying drawings (FIGS. 3 to 5). The parts which have the same reference numerals as in FIGS. 1 and 2 will be generally excluded from the following explanation.

A cathode bus bar 10 is secured to a side portion of the cathode structure 2 by welding or an explosive bonding method, etc. The connecting end of the bus bar 10 is bent outwardly at, for example, right angles to form a cathode bus bar connecting part 11. The cathode bus bar connecting part 11 may be an integral part of the cathode bus bar 10 and formed by bending the end of the bus bar 10 as described above. Or it may be formed separately and bonded to the bus bar 10 by welding. The cathode bus bar connecting part 11, when seen along the line A—A of FIG. 3 (i.e. FIG. 4), comprises a part 11A for connecting the intercell bus bar and a part 11B for attaching a short circuit switch. However, the cathode bus bar 11A on the opposite side as shown in FIG. 5 usually does not require the provision of a short circuit switch, and therefore, may be constructed correspondingly in a shorter size.

Anode bus bar 14 is provided on an anode bottom plate 13 of the anode base. This bus bar 14 has a rectangular surface on the cell side as shown in FIG. 4, and is composed of a part 14A for connecting the intercell bus bar and a part 14B for fitting a short circuit switch. However, since the anode bus bar 14A on the opposite side (FIG. 5) usually does not require the provision of a short circuit switch, the intercell bus bar connecting part may not include a part corresponding to 14B in order to reduce the weight of the bus bar.

As in the conventional electrolytic cell, this anode bus bar may be made of copper, and can be electrically and mechanically connected to an anode electrode using a lead material. It is preferred in this case that the anode bus bars 14A and 14B and the anode bottom plate 13 should be formed as an integral body within the cell. In an especially preferred embodiment of this invention, the anode bus bars are made of aluminum, and the anode bus bars 14A and 14B and the anode bottom plate 13 are formed integrally on the bottom of the cell.

A curved intercell bus bar 15 is fitted between the anode bus bar 14A and the cathode bus bar 11A and connected to the vertical end portions of the anode bus bar and the cathode bus bar in a vertical-vertical arrangement. For ease of operation, the intercell bus bar 15, in an embodiment shown in the drawings, consists of three bar units. If desired, the intercell bus bar 15 may be rendered flexible by providing a flexible part made of, for example, a number of flexible, angled or curved strips of an electrically conductive material, such as copper or aluminum, and such a flexible intercell bus bar can be fitted with extreme ease.

As described above, the cathode bus bar part 11A is shorter than the cathode bus bar connecting part 11 since it does not have a surface to which a short circuit switch is to be installed. If a flow which deviates is likely to occur when electricity is put out, the cathode bus bar 11A may include a surface on which to provide a short circuit switch similar to the cathode bus bar 11. Naturally, in this case, the anode bus bar 14A should have a portion to which a short circuit switch can be secured, similar to the cathode bus bar 11A.

As is clear from the above description, this invention does not require installation of connecting bus bars between the cells, and therefore, the intercell distance can be reduced. Since the bus bar connecting work can be done in the larger spaces between a series of electrolytic cells, the working efficiency is extremely enhanced. The spaces on both sides of a group of electrolytic cells connected in series are utilized for pipes through which to pass chlorine gas and hydrogen gas evolved from the electrolytic cells and the electrolytic liquid, and for inspection of short circuit switches, and as passageways for transportation of the electrolytic cells and for operation inspection. If the layout of these is properly made, the bus bar connecting portion protruding outwardly from the cell groups does not cause an increase in floor space.

The present invention has the advantage that since the number of connected parts is small, the electric loss is extremely reduced. Furthermore, the use of a lead material and a reinforcing material can be omitted by using aluminum as an anode bus bar and forming the anode bottom plate and the anode bus bar as an integral body. This also serves to simplify extremely the construction of the electrolytic cells, and as a result of the direct connection of the electrode (anode) to the bus bars, electrical loss can be reduced.

Now, specific comparison will be made between the effect of the conventional bus bar connecting method and that of the bus bar connecting method in accordance with this invention.

It was found that when the floor space for electrolytic cells was 2.56 m.$^2$, the intercell distance required conventionally was 0.65 m., but only 0.2 m. for the present invention. In other words, according to the present invention, the floor space occupied by the cells is reduced by about 15% as compared with the floor space occupied conventionally.

The weights of the bus bars used are tabulated below for comparison. The current was 50 ka., and the current density of copper was 185 a./cm.$^2$.

| Bus bars place of use | Conventional method | | Method of this invention | |
|---|---|---|---|---|
| | Weight (kg.) | Material | Weight (kg.) | Material |
| Cathode bus | 433 | Copper | 310 | Copper. |
| Intercell bus | 218 | ......do....... | 151 | Do. |
| Anode bus | 60 | ......do....... | 183 | Do. |
| Total | 711 | | 644 | |

The bus bar connecting method of this invention not only is especially suitable for metal anodes, but can also be applied to graphite anodes.

What we claim is:

1. A bus bar assembly for a diaphragm-type electrolytic cell for electrically connecting a side portion of a cathode structure to an end portion of an anode base comprising:
   cathode bus bars connected to a side portion of said cathode structure, said cathode bus bars having an end portion thereof at an outward angle transverse to the plane of the side portion of said cathode structure,
   anode bus bars connected to a side end portion of said anode base, said anode bus bars having a portion thereof at an upward angle transverse to the plane of said base, said cathode bus bar end portion and said anode bus bar portion being in respective planes perpendicular to one another, and
   interconnecting means connecting the end portion of a cathode bus bar of one cell to said anode bus bar portion on an adjacent cell, said interconnecting means having two portions in the same planes, respectively, as said cathode bus bar portion and said anode bus bar portion.

2. The bus bar assembly of claim 1, wherein said anode bus bars are formed integrally with said anode base.

3. The bus bar structure of claim 1, wherein said anode base comprises two side end portions, wherein said cathode structure has two cathode bus bars connected thereto and wherein the outward portion of one of said cathode bus bars and the upward portion of one of said anode bus bars are smaller in size than that of the other cathode and anode bus bar.

References Cited
UNITED STATES PATENTS
3,498,903    3/1970    Kamarjan      204—258
3,591,483    7/1971    Loftfield et al.      204—263

JOHN H. MACK, Primary Examiner

W. I. SOLOMON, Assistant Examiner

U.S. Cl. X.R.

204—244, 253, 258, 267